(No Model.)
W. G. KAY.
NUT LOCK.
No. 518,066. Patented Apr. 10, 1894.
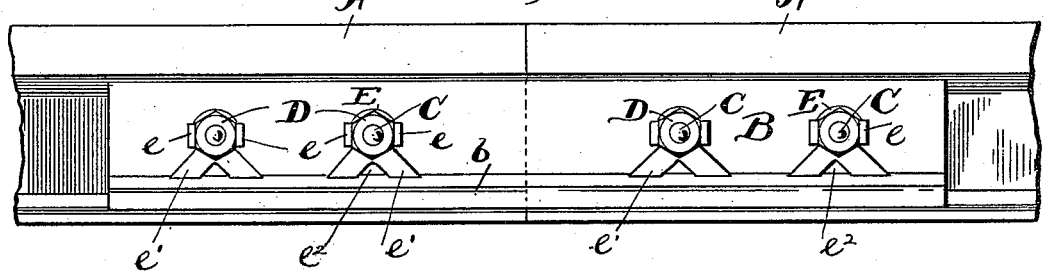
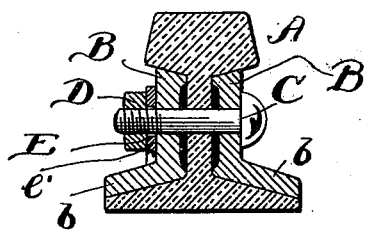 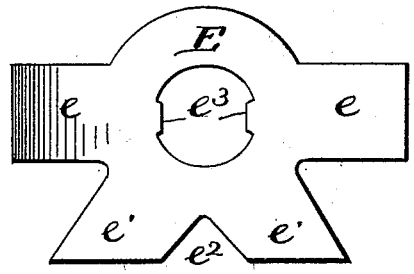
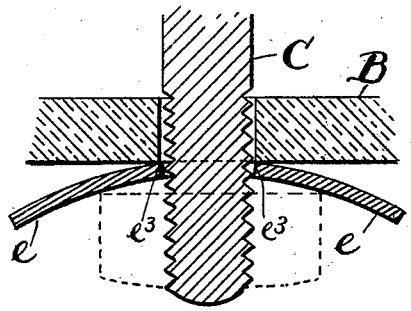 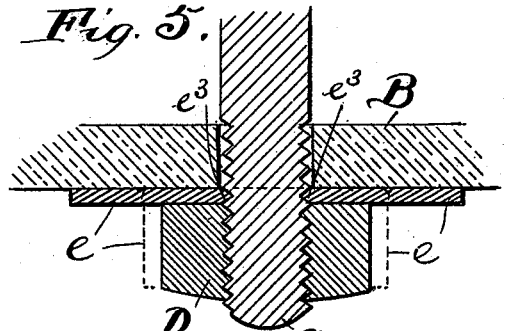
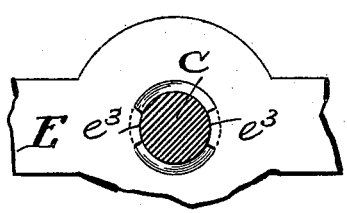
Witnesses.
E. Byron Gilchrist
Inventor
William G. Kay
By Leggett & Leggett
Attorneys.

UNITED STATES PATENT OFFICE.

WILLIAM G. KAY, OF BROOKLYN, ASSIGNOR OF ONE-HALF TO HARRY S. STEVENS, OF CLEVELAND, OHIO.

NUT-LOCK.

SPECIFICATION forming part of Letters Patent No. 518,066, dated April 10, 1894.

Application filed July 20, 1893. Serial No. 481,079. (No model.)

*To all whom it may concern:*

Be it known that I, WILLIAM G. KAY, of Brooklyn, in the county of Cuyahoga and State of Ohio, have invented certain new and useful Improvements in Nut-Locks; and I do hereby declare the following to be a full, clear, and exact description of the invention, such as will enable others skilled in the art to which it pertains to make and use the same.

My invention relates to improvements in nut-locks, more especially adapted for securely locking the nuts employed in securing together the meeting-rails, by means of fish-plates, in rail-joints; and it consists in certain features of construction and in combination of parts hereinafter described and pointed out in the claim.

In the accompanying drawings, Figure 1 is a side elevation of a rail-joint, wherein the nuts that secure the fish-plates in place are locked by devices embodying my invention. Fig. 2 is a transverse section taken through one of the securing-bolts shown in Fig. 1. Fig. 3 shows my improved nut-lock detached. Fig. 4 is a horizontal section showing the manner of placing the nut-lock upon the shank of the bolt before applying the nut. Fig. 5 is a horizontal section showing the nut and nut-lock in place. Fig. 6 is a transverse section, showing more clearly the manner in which the inwardly-projecting tooth or teeth of the lock engage or bite adjacent threads of the bolt.

Referring to the drawings, A A, Figs. 1 and 2, represent two meeting-rails, and B B the fish-plates that secure the rails together, said fish-plates being flanged outwardly at their lower ends, as at $b$, with said outwardly-projecting flanges engaging the base of the rails.

C designates the bolts that secure the rails and fish-plates together; D the nuts mounted on the bolt-shanks at the outer side of the fish-plates, and E the nut-locks.

The nut-lock consists of a washer, one of which is shown detached in Fig. 3, the washer having one or more outwardly-projecting wings or flanges, $e$, designed to be bent laterally against the adjacent side of the nut, when the latter is secured in position on the shank of the bolt, and thereby securely hold the nut against turning independently of the washer. The washer has also a pair of outwardly-projecting flanges, or wings, $e'$, arranged preferably at a right or approximately a right angle to each other with a V-shaped space $e^2$, or any suitably shaped slot or opening between the wings or flanges, the latter, when the parts are assembled, engaging the outwardly-projecting flange of the adjacent fish-plate, the one wing or flange $e'$ preventing the washer from turning in the one direction and the other wing or flange $e'$ holding the washer against turning in the opposite direction. By the construction thus far described, it will be observed that the washer is efficiently held against turning in either direction, and the nut and washer are securely locked against turning independently of each other. The V-shaped space or opening, $e^2$, formed between wings or flanges $e'$, performs an important function in that it affords egress to any scales or rust formed upon the fish-plates between the latter and the washer and hence prevents wings or flanges $e'$ being pressed or bent outwardly by the formation of such rust or coating. The washer is also preferably provided with an inwardly-projecting tooth or teeth, $e^3$, adapted to engage or bite the threaded shank of the bolt when the parts are properly assembled, and thereby steady or more securely hold the bolt in position in the bolt-hole.

The application of a washer having the inwardly-projecting tooth or teeth just referred to is very clearly shown in Figs. 4 and 5, the washer, preparatory to placing the same upon the shank of the bolt and against the fish-plate or other object, being bent laterally in the direction away from the object as shown in Fig. 4, to thereby enlarge the diameter of the bolt-hole in the washer at the location of the aforesaid inwardly-projecting tooth or teeth and enable the washer to be readily passed over the shank of the bolt and into position against the fish-plate or object, whereupon the washer is straightened out, as shown in Fig. 5, and in thus straightening the washer, it is obvious that the inwardly-projecting tooth or teeth of the washer will engage or bite the adjacent threads of the bolt-shank and thereby steady and hold the latter.

What I claim is—

A nut-lock comprising a washer having one or more wings or flanges, $e$, for engaging the nut a pair of wings or flanges, $e'$, arranged substantially as indicated, to engage an abutment on the body and one or more inwardly-projecting teeth, $e^3$, to engage the bolt substantially as and for the purpose set forth.

In testimony whereof I sign this specification, in the presence of two witnesses, this 9th day of June, 1893.

WILLIAM G. KAY.

Witnesses:
C. H. DORER,
WARD HOOVER.